United States Patent
Siddiqui et al.

(10) Patent No.: US 12,105,713 B2
(45) Date of Patent: Oct. 1, 2024

(54) COMPRESSING WORKLOADS FOR SCALABLE INDEX TUNING

(71) Applicant: Microsoft Technology Licensing, LLC, Redmond, WA (US)

(72) Inventors: Tarique Ashraf Siddiqui, Redmond, WA (US); Saehan Jo, Ithaca, NY (US); Wentao Wu, Bellevue, WA (US); Chi Wang, Redmond, WA (US); Vivek Ravindranath Narasayya, Redmond, WA (US); Surajit Chaudhuri, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

(21) Appl. No.: 17/740,660

(22) Filed: May 10, 2022

(65) Prior Publication Data

US 2023/0367771 A1 Nov. 16, 2023

(51) Int. Cl.
| | |
|---|---|
| G06F 16/00 | (2019.01) |
| G06F 11/34 | (2006.01) |
| G06F 16/21 | (2019.01) |
| G06F 16/22 | (2019.01) |
| G06F 16/2453 | (2019.01) |
| G06F 16/248 | (2019.01) |

(52) U.S. Cl.
CPC .... *G06F 16/24549* (2019.01); *G06F 11/3409* (2013.01); *G06F 16/21* (2019.01); *G06F 16/221* (2019.01); *G06F 16/24539* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,266,658 B1 | 7/2001 | Adya | |
| 2006/0036989 A1* | 2/2006 | Chaudhuri | G06F 16/22 717/127 |
| 2018/0096006 A1* | 4/2018 | Das | G06F 16/221 |

OTHER PUBLICATIONS

"Azure SQL Database", Retrieved from: https://web.archive.org/web/20220408100825/https://azure.microsoft.com/en-us/products/azure-sql/database/, Apr. 8, 2022, 14 Pages.

(Continued)

*Primary Examiner* — Thu Nguyet T Le
(74) *Attorney, Agent, or Firm* — RAY QUINNEY & NEBEKER; Tiffany Healy

(57) ABSTRACT

The present disclosure relates to methods and systems for compressing workloads for use with index tuning. The methods and systems receive a workload with a plurality of queries. The methods and systems represent each query using query features and a utility. The methods and systems select a query for a query subset based on a benefit of the query determined using the query features and the utility. The methods and systems update the features and the utility of the remaining queries in the workload and select another query to add to the query subset based on an updated benefit determined using the updated features and utilities. The methods and systems select queries for the query subset equal to a received query subset size. The methods and systems use the query subset in index tuning to provide one or more indexes to recommendations.

20 Claims, 4 Drawing Sheets

(56) References Cited

OTHER PUBLICATIONS

"Cloud SQL", Retrieved from: https://cloud.google.com/sql, Retrieved Date: Feb. 20, 2022, 25 Pages.
Brenner, et al., "Monitor performance by using the Query Store", Retrieved from: https://docs.microsoft.com/en-us/sql/relational-databases/performance/monitoring-performance-by-using-the-query-store?view=sql-server-ver15, May 7, 2022, 15 Pages.
Bruno, et al., "Automatic physical database tuning: a relaxation-based approach", In Proceedings of the ACM SIGMOD international conference on Management of data, Jun. 14, 2005, pp. 227-238.
Chaudhuri, et al., "An Efficient Cost-Driven Index Selection Tool for Microsoft SQL Server", In Proceedings of the 23rd International Conference on Very Large Data Bases, Aug. 25, 1997, pp. 146-155.
Chaudhuri, et al., "Anytime Algorithm of Database Tuning Advisor for Microsoft SQL Server", Retrieved from: https://www.microsoft.com/en-us/research/uploads/prod/2020/06/Anytime-Algorithm-of-Database-Tuning-Advisor-for-Microsoft-SQL-Server.pdf, Jun. 2020, 10 Pages.
Chaudhuri, et al., "AutoAdmin 'What-if' Index Analysis Utility", In ACM SIGMOD Record, Jun. 1, 1998, pp. 367-378.
Chaudhuri, et al., "Compressing SQL workloads", In Proceedings of the ACM SIGMOD international conference on Management of data, Jun. 4, 2002, pp. 488-499.
Chaudhuri, et al., "Index merging", In Proceedings of 15th International Conference on Data Engineering, Mar. 23, 1999, 8 Pages.
Chaudhuri, et al., "Primitives for workload summarization and implications for SQL", In Proceedings of the 29th VLDB Conference, Jan. 1, 2003, 12 Pages.
Bruno, et al., "To Tune or not to Tune? A Lightweight Physical Design Alerter", In Proceedings of the 32nd international conference on Very large data bases, Sep. 12, 2006, pp. 499-510.
Chauhdhri, et al., "Index Selection for Databases: A Hardness Study and a Principled Heuristic Solution", In journal of IEEE Transactions on Knowledge and Data Engineering, vol. 16, Issue 11, Nov. 2004, pp. 1313-1323.
Comer, Douglas, "The Difficulty of Optimum Index Selection", In Journal of ACM Transactions on Database Systems, vol. 3, Issue 4, Dec. 1978, pp. 440-445.
Das, et al., "Automatically Indexing Millions of Databases in Microsoft Azure SQL Database", In Proceedings of the International Conference on Management of Data, Jun. 30, 2019, pp. 666-679.
Dasgupta, et al., "Summarization Through Submodularity and Dispersion", In Proceedings of the 51st Annual Meeting of the Association for Computational Linguistics, Aug. 4, 2013, pp. 1014-1022.
Papadomanolakis, et al., "Efficient use of the query optimizer for automated database design", In Proceedings of the 33rd international conference on Very large data bases, Sep. 23, 2007, pp. 1093-1104.
Deep, et al., "Comprehensive and Efficient Workload Compression", IN Repository of: arXiv:2011.05549v2, Feb. 3, 2021, 19 Pages.
Deep, et al., "Comprehensive and Efficient Workload Compression", In Proceedings of the VLDB Endowment, vol. 14, Nov. 11, 2020, pp. 418-430.
Ding, et al., "AI Meets AI: Leveraging Query Executions to Improve Index Recommendations", In Proceedings of the International Conference on Management of Data, Jun. 30, 2019, pp. 1241-1258.
Ding, et al., "DSB: A Decision Support Benchmark for Workload-Driven and Traditional Database Systems", In Proceedings of the VLDB Endowment, vol. 14, Issue 13, Sep. 2021, pp. 3376-3388.
Finkelstein, et al., "Physical Database Design for Relational Databases", In Journal of ACM Transactions on Database Systems, vol. 13, Issue 1, Mar. 1988, pp. 91-128.
Furman, et al., "Statistics", Retrieved from: https://docs.microsoft.com/en-us/sql/relational-databases/statistics/statistics?view=sql-server-ver15, Feb. 23, 2022, 22 Pages.
Ghanayem, et al., "DTA utility", Retrieved from: https://docs.microsoft.com/en-us/sql/tools/dta/dta-utility?view=sql-server-ver15, May 12, 2021, 14 Pages.
Ghosh, et al., "Plan selection based on query clustering", In Proceedings of the 28th international conference on Very Large Data Bases, Aug. 20, 2002, 12 Pages.
Gonzalez., Teofilo F, "Clustering to minimize the maximum intercluster distance", In Theoretical Computer Science 38, 1985, pp. 293-306.
Jain, et al., "Query2Vec: An Evaluation of NLP Techniques for Generalized Workload Analytics", In Repository of arXiv:1801.05613v2, Feb. 2, 2018, 14 Pages.
Kane, et al., "DEXTER", Retrieved from: https://github.com/ankane/dexter, Mar. 26, 2021, 9 Pages.
Kossmann, et al., "Magic mirror in my hand, which is the best in the land? An Experimental Evaluation of Index Selection Algorithms", In Proceedings of the VLDB Endowment, vol. 13, Issue 12, Jul. 1, 2020, pp. 2382-2395.
Krause, et al., "Submodular Function Maximization", In Journal of Tractability, Feb. 2014, pp. 1-28.
Kul, et al., "Ettu: Analyzing query intents in corporate databases", In Proceedings of the 25th international conference companion on world wide web, Apr. 2016, pp. 463-466.
Mehrotra, et al., "Representative & informative query selection for learning to rank using submodular functions", In Proceedings of the 38th international ACM sigir conference on research and development in information retrieval, Aug. 9, 015, pp. 545-554.
Nemhauser, et al., "An analysis of approximations for maximizing submodular set functions—I", In Mathematical Programming, vol. 14, Issue 1, Dec. 1978, pp. 265-294.
Niwattanakul, et al., "Using of Jaccard coefficient for keywords similarity", In Proceedings of the international multiconference of engineers and computer scientists, vol. 1, Mar. 13, 2013, pp. 380-384.
"International Search Report and Written Opinion Issued in PCT Application No. PCT/US23/017646", dated Jul. 17, 2023., 13 pages.
Ranu, et al., "Answering Top-k Representative Queries on Graph Databases", In Proceedings of the ACM SIGMOD International Conference on Management of Data, Jun. 2014, pp. 1163-1174.
Satopaa, et al., "Finding a" kneedle"in a haystack: Detecting knee points in system behavior", In Proceedings of 31st international conference on distributed computing systems workshops, Jun. 20, 2011, pp. 1-6.
Siddiqui, et al., "Cost Models for Big Data Query Processing: Learning, Retrofitting, and Our Findings", In Proceedings of the ACM SIGMOD International Conference on Management of Data, Jun. 14, 2020, pp. 99-113.
Siddiqui, et al., "ISUM: Efficiently Compressing Large and Complex Workloads for Scalable Index Tuning", In Proceedings of the International Conference on Management of Data, Jun. 12, 2022, 20 Pages.
Valentin, et al., "DB2 Advisor: An Optimizer Smart Enough to Recommend Its Own Indexes", In Proceedings of 16th International Conference on Data Engineering, Feb. 29, 2000, 10 Pages.

* cited by examiner

COMPRESSING WORKLOADS FOR SCALABLE INDEX TUNING

BACKGROUND

Today's database systems include index tuners that recommend an appropriate set of indexes for a given workload. Since index tuning on large and complex workloads can be resource intensive and time consuming, workload compression techniques have been proposed to improve the scalability of index tuning. Workload compression must efficiently identify a small subset of queries in the workload to tune such that the indexes recommended when tuning the compressed workload give similar performance improvements as when tuning the input workload.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a workload with a plurality of queries. The method includes computing, for each query of the plurality of queries, query features and a utility. The method includes selecting a query to add to a query subset based on a benefit determined by using the query features and the utility. The method includes determining whether a size of the query subset is less than a query subset size. The method includes updating the query features and the utility for remaining queries of the plurality of queries in response to determining the size of the query subset is less than the query subset size. The method includes selecting another query to add to the query subset based on an updated benefit using updated query features and updated utility in response to determining the size of the query subset is less than the query subset size. The method includes continuing to update the query features and the utility for the remaining queries of the plurality of queries and selecting other queries to add to the query subset based on the updated benefit determined by using the updated query features and the updated utility until the size of the query subset is equal to the query subset size. The method includes adding query weights to selected queries in the query subset in response to determining the size of the query subset is equal to the query subset size.

Some implementations relate to a device. The device includes one or more processors; memory in electronic communication with the one or more processors; and instructions stored in the memory, the instructions executable by the one or more processors to: receive a workload with a plurality of queries; compute, for each query of the plurality of queries, query features and a utility; select a query to add to a query subset based on a benefit determined by using the query features and the utility; determine whether a size of the query subset is less than a query subset size; update the query features and the utility for remaining queries of the plurality of queries in response to determining the size of the query subset is less than the query subset size; select another query to add to the query subset based on an updated benefit using updated query features and updated utility in response to determining the size of the query subset is less than the query subset size; continue to update the query features and the utility for the remaining queries of the plurality of queries and selecting other queries to add to the query subset based on the updated benefit determined by using the updated query features and the updated utility until the size of the query subset is equal to the query subset size; and add query weights to selected queries in the query subset in response to determining the size of the query subset is equal to the query subset size.

Some implementations relate to a method. The method includes receiving a workload with a plurality of queries. The method includes computing, for each query of the plurality of queries, query features and a utility. The method includes computing workload summary features for the query features and the utility. The method includes selecting a query to add to a query subset based on a benefit determined by using the workload summary features. The method includes determining whether a size of the query subset is less than a query subset size. The method includes updating the query features, the utility, and the workload summary features for remaining queries of the plurality of queries in response to determining the size of the query subset is less than the query subset size. The method includes selecting another query to add to the query subset based on an updated benefit determined by using updated workload summary features in response to determining the size of the query subset is less than the query subset size. The method includes continuing to update the query features, the utility, and the workload summary features for the remaining queries of the plurality of queries and selecting other queries to add to the query subset based on the updated benefit determined by using the updated workload summary features until the size of the query subset is equal to the query subset size. The method includes adding query weights to the selected queries in the query subset in response to determining the size of the query subset is equal to the query subset size.

Some implementations relate to a device. The device includes one or more processors; memory in electronic communication with the one or more processors; and instructions stored in the memory, the instructions executable by the one or more processors to: receive a workload with a plurality of queries; compute, for each query of the plurality of queries, query features and a utility; compute workload summary features for the query features and the utility; select a query to add to a query subset based on a benefit determined by using the workload summary features; determine whether a size of the query subset is less than a query subset size; update the query features, the utility, and the workload summary features for remaining queries of the plurality of queries in response to determining the size of the query subset is less than the query subset size; select another query to add to the query subset based on an updated benefit determined by using updated workload summary features in response to determining the size of the query subset is less than the query subset size; continue to update the query features, the utility, and the workload summary features for the remaining queries of the plurality of queries and selecting other queries to add to the query subset based on the updated benefit determined by using the updated workload summary features until the size of the query subset is equal to the query subset size; and add query weights to the selected queries in the query subset in response to determining the size of the query subset is equal to the query subset size.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
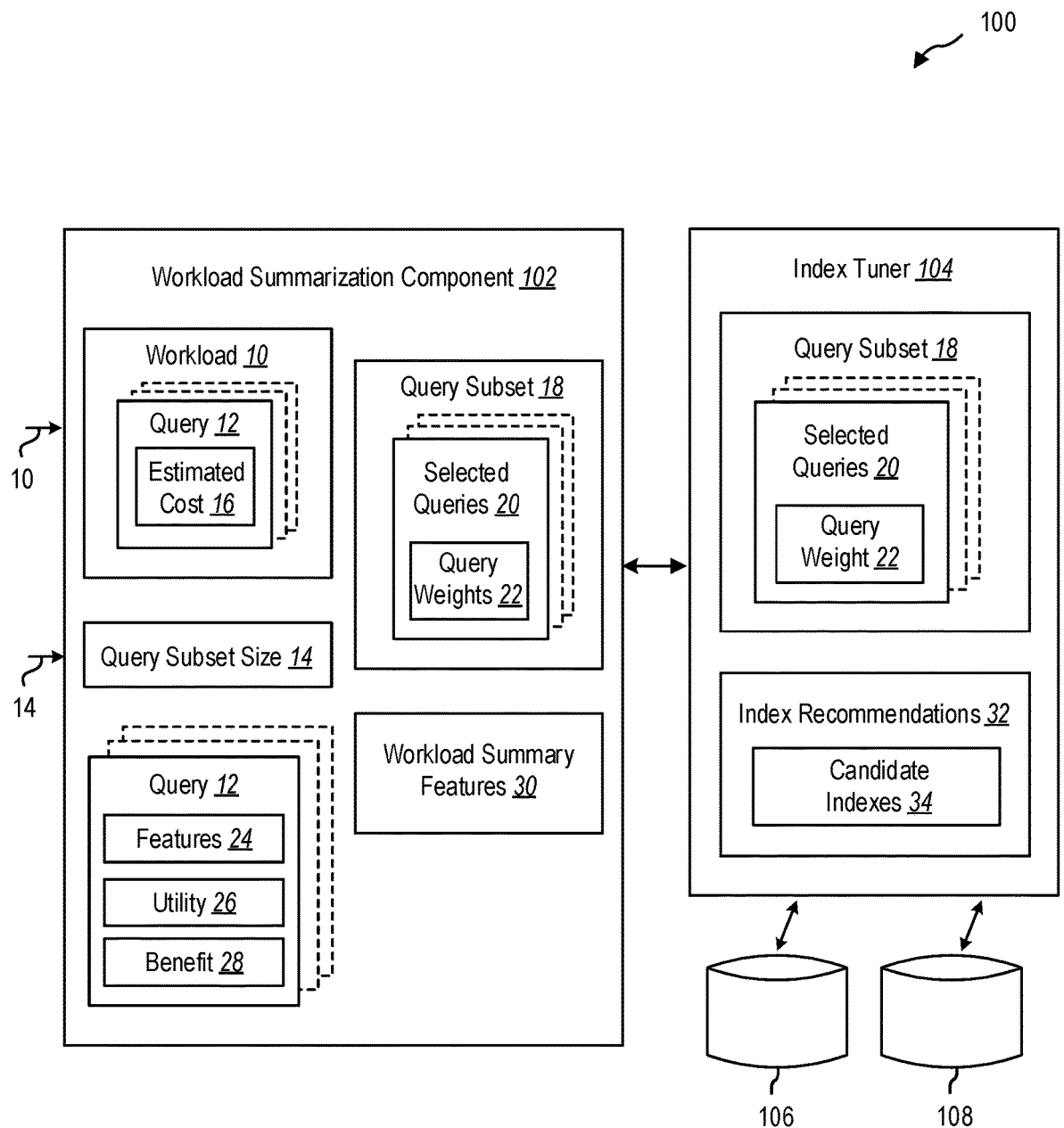
FIG. 1 illustrates an example environment for compressing workloads for use with index tuning in accordance with implementations of the present disclosure.

This disclosure generally relates to index tuning. Today's database systems include index tuners that recommend an appropriate set of indexes for a given workload. Indexes improve query performance in databases. Index tuners perform index tuning to search for appropriate indexes given an input workload and a set of constraints. However, index tuning can be resource intensive and time consuming when the input workloads are large and consist of complex structured query language (SQL) queries. This challenge is amplified in cloud databases where large numbers of databases need to be tuned by the service provider.

Since index tuning on large and complex workloads can be resource intensive and time consuming, workload compression techniques have been proposed to improve the scalability of index tuning. Workload compression must efficiently identify a small subset of queries in the workload to tune such that the indexes recommended when tuning the compressed workload give similar performance improvements as when tuning the input workload.

To improve index tuning efficiency, prior solutions have performed workload compression (e.g., finding a smaller subset of queries from the input workload as a compressed workload) that may be used for index tuning. There are two requirements for any workload compression technique. First, the improvement in the performance of the input workload due to the indexes recommended based on tuning the compressed workload should be close to that of the indexes obtained by tuning the input workload. Second, the compressed workload needs to be found efficiently, otherwise the advantage of selecting a smaller workload is negated. However, prior solutions fail to capture similarities between queries and often miss queries that may provide improvements in performance on index tuning but may be less frequent in the workload. Another disadvantage of prior solutions is clustering of queries may be inefficient when there are a large number of instances per group due to pairwise comparisons between queries. As such, in prior solutions identifying indexes that may benefit all the queries is time consuming and resource intensive. Moreover, in prior solutions optimizer calls are made to identify the queries to use for index tuning, which is resource intensive.

The present disclosure provides methods and systems for compressing workloads for use with index tuning. Workloads include a group of queries to query a database for results. In some implementations, queries are structured query language (SQL) queries (also referred to as sequel queries). The methods and systems provide an efficient and scalable workload summarization technique that results in improved index recommendations for indexes. The indexes are built on databases to perform a search faster and/or using fewer resources. The methods and systems estimate the performance improvement over the input workload for selecting a subset of queries for tuning such that the estimated performance improvements are correlated with the actual improvements over the input workloads. The methods and systems select queries for the subset of queries that are similar to the queries in the workload that have a high potential for performance improvement if added to an index (e.g., queries with high costs and more selective predicates).

The methods and systems use the query subset in index tuning and determining one or more candidate indexes to recommend for building on the databases. The number of queries included in the query subset is less than the number of queries included in the original workload. As such, the query subset includes a compressed workload to use in index tuning. The queries are selected for the query subset if the query has a high potential for reduction in its costs on adding indexes (e.g., the utility of the query is high) from the query to the candidate indexes and if the candidate indexes obtained on tuning the selected query has a high potential for reducing the cost of other queries in the input workload (e.g., an influence of the query is high).

It is expensive to make optimizer calls or use an index tuner to determine the queries for use in index tuning or compute a reduction in cost for the queries on adding indexes. Instead, the methods and systems of the present disclosure use the cost of the queries and statistics to estimate the potential for reduction in the cost of the query on adding indexes. Specifically, a query with higher cost and more selective filters has a higher potential for reduction in cost. For measuring influence of the query, the methods and systems characterize how useful are indexes obtained from the query to other queries in the workload.

The methods and systems represent each query using a set of features and assign weights to the features using size of tables, position of columns in the query, and statistics (e.g., selectivity) so that two queries with similar set of feature values result in similar set of indexes. A query with higher similarity with other queries that have high potential for reduction in their costs has higher influence. The methods and systems select a query with the highest benefit (e.g., highest sum of utility and influence of the query) of selecting the query. In some implementations, the methods and systems use a greedy algorithm that incrementally selects queries in decreasing order of benefits. The methods and systems update the feature weights and potential for reduction in response to a query being selected for the query subset such that queries that are dissimilar from already selected queries get higher values.

As such, the methods and systems represent each query as a set of features such that two queries with similar values of the features may likely result in a similar set of indexes. Representing each query as a set of features also allows a quantification of a similarity between queries with different templates. The methods and systems compute a feature value and adjusts the similarity score using query costs and statistics that are indicative of potential improvement in the costs of queries.

In some implementations, the methods and systems use a summarization technique that aggregates query-level features into workload-level features such that a higher weight is given to features of queries with high potential for performance improvement. The single workload-level representation allows measuring the similarity of each query with the input workload without performing pairwise comparisons, thereby allowing the use of a fast linear-time algorithm.

The selected queries included in the query subset (e.g., the compressed workload) represent the input workload to varying degrees. The methods and systems weight the selected queries in the query subset so that the query weight captures a relative importance of the selected query with respect to the input workload. The query subset, consisting of the selected queries and the corresponding weights, is passed to the index tuner to generate index recommendations based on the query subset.

One technical advantage of the methods and systems includes reducing the time and resources required for tuning large workloads, and thus, improving the performance of workloads running on database systems or services while also reducing the total cost of ownership of the databases systems or services. The methods and systems provide a new workload compression algorithm that improves upon current systems for index tuning in efficiency and in quality of index tuning. The methods and systems use a low-overhead technique for estimating the improvement in performance of the input workload when a subset of queries is selected for index tuning. For example, the methods and systems perform the index tuning in less time and use less resources to identify the candidate indexes by using the subset of queries for index tuning.

Another technical advantage of the methods and systems includes concisely representing information across queries in the workload that improves scalability by avoiding pairwise comparisons between queries when choosing the set of queries to tune. The methods and systems combine query-level features into a concise workload-level features. This summarized workload level features may be leveraged to directly estimate the impact of selected queries on the entire workload without performing pairwise comparison between queries.

Another technical advantage of the methods and systems includes using an efficient and scalable linear-time algorithm that selects a subset of queries while considering interdependencies between queries. The methods and systems selectively prune out queries and features for improving efficiency with minimal reduction in quality of the recommended indexes.

As such, the methods and systems of the present disclosure result in improved index recommendations for indexes while being efficient. The methods and systems identify a subset of queries of the workload that captures the characteristics of the queries included in the entire workload and use the subset of queries as a compressed workload for index tuning. By using a compressed workload for index tuning, less time and resources are used in identifying indexes with a similar quality as indexes identified by tuning over the entire workload.

Referring now to FIG. 1, illustrated is an example environment 100 for providing compressed workloads for use with index tuning. The environment 100 includes a workload summarization component 102 that receives a workload 10 with a plurality of queries 12 on a given database. The workload 10 includes a collection of queries 12 or a group of queries 12 for querying a given database 106, 108 for results. In some implementations, the queries are structured query language (SQL) queries (also referred to as sequel queries). Each query 12 also includes an estimated cost 16 for running the query 12. The estimated cost 16 includes an amount of time to run the query 12.

The workload summarization component 102 also receives a query subset size 14 with a number of queries to include in a query subset 18 to use in index tuning. The query subset size 14 may be any positive number less than the number of queries 12 included in the workload 10. The query subset 18 is provided to an index tuner 104 to perform index tuning. Thus, instead of the index tuner 104 using the entire workload 10 for index tuning, the index tuner 104 uses the query subset 18 with a smaller number of selected queries 20 (e.g., a compressed workload) for index tuning that results in index recommendations 32 for candidate indexes 34 that minimize the cost of the workload 10. The selected indexes from the candidate indexes 34 are built on the databases 106, 108 to perform a search faster and/or using fewer resources.

The workload summarization component 102 computes features 24 for each query 12 in the workload 10. The features 24 include the indexable columns in the query 12 and an associated weight for the indexable columns. The query features 24 is a set of normalized weights, one normalized weight for each indexable column in the workload. A column in a query is indexable if the column is part of a filter or join condition, or if the column specifies the grouping or ordering of tuples. As such, the following columns are indexable columns: (1) filter columns, (2) join columns, (3) group-by columns, and (4) order-by columns. Index tuners 104 derive candidate indexes 34 from indexable columns by combing the indexable columns in different orders.

The weight for the indexable columns assigns a value to the indexable columns for a potential improvement in a performance of the workload 10. For example, a higher weight is given to indexable columns with a high potential for performance improvement in the workload 10 (e.g., a faster search and/or using less resources) and a lower weight is given to indexable columns with a lower potential for performance improvement in the workload 10.

A large part of the query cost may involve accessing, joining, or ordering a few expensive tables. An equation used by the workload summarization component 102 to assign a weight to a table is as follows:

$$w_{table} = \frac{n(t_i)}{\sum_j n(t_j)} \qquad 1)$$

where $n(t_i)$ is the size of the input table $t_i$ and w is the weight. The importance of indexable columns may vary depending on whether the indexable columns occur as part of filter/join predicate, or group-by/order-by clause.

In some implementations, the workload summarization component 102 may measure the importance of an indexable column by counting the proportion of candidate indexes that an indexable column belongs to. The workload summarization component 102 may measure the total number of possible candidate indexes, $d(t_i)$, that may be generated by combining indexable columns in different orders. An equation used by the workload summarization component 102 to determine a weight for the indexable column is:

$$w(c) = \frac{d(t_i, c)}{d(t_i)} \times w_{table}(t_i) \qquad (2)$$

where $d(t_i,c)$ is the fraction of candidate indexes in $d(t_i)$ that contain the indexable column (c). The weight (w) of the indexable column (c) is based on the position of the indexable column (c).

Estimating d(t,c) does not require enumeration of candidate indexes or invocation of the index tuner 104. Index tuners 104 may apply a set of common rules that combine indexable columns in different orders to generate candidate indexes. Given a set of common rules across index tuners and the number of columns for each position, the workload summarization component 102 may estimate d(t) and d(t,c) without making an optimizer call or invoking the index tuner 104.

In some implementations, the workload summarization component 102 may use statistics, such as, selectivity or density of an indexable column to determine the weight of the indexable column. If u is the number of distinct values for the column, then density may be measured as 1/u. Two queries (e.g., queries 12) with similar values of these statistics tend to generate similar candidate indexes since the index tuners 104 use these statistics to estimate an importance of an index as well as to order the columns in an index. The workload summarization component 102 may decide whether to use selectivity or density to determine the weight of the indexable column depending on the position of the indexable column. For filter and join columns, the workload summarization component 102 may use selectivity, while for order-by and group-by columns the workload summarization component 102 may use density since the costs of corresponding operations may be correlated with the number of unique values in the column. In general, a smaller value of these statistics leads to a higher weight, indicating that building an index on such a column may lead to higher improvement in cost of the workload 10.

An equation used by the workload summarization component 102 to calculate the weight of an indexable column using statistics is:

$$w(c) = (1-s(c)) \times w_{table}(t_i). \qquad (3)$$

where s(c) is the value of statistics for the column (c) and (w) is the weight of the column and {c1, c2, . . . , cm} is a set of m indexable columns of a query (q). The workload summarization component 102 may use these indexable columns as features for the query 12 with the normalized weights as the values of the features 24 for the query 12, computed using min-max normalization as illustrated in the below equation.

$$\overline{w}_{ci} = \frac{w_{ci}}{\max_j(w_{cj}) - \min_j(w_{cj})} \qquad (4)$$

By representing each of the queries 12 as a set of features 24, two queries 12 with similar values of the features 24 may likely result in a similar set of indexes. Representing each query 12 as a set of features 24 also allows a quantification of a similarity between queries 12 with different templates.

An equation used by the workload summarization component 102 to define a similarity between two queries in the workload 10 using the features 24 is:

$$S(q_i, q_j) = \frac{C_{qi} \cap C_{qj}}{C_{qi} \cup C_{qj}} \qquad (5)$$

where $Cq_i$ and $Cq_j$ be the sets of indexable columns (e.g., the features 24) for the queries 12 ($q_i$) and ($q_j$). The similarity (s) can be defined in terms of indexable columns (e.g., the features 24 of the queries 12).

The workload summarization component 102 also computes a utility 26 for each query 12 in the workload 10. The utility 26 is an estimated improvement (e.g., a reduction in cost) in the workload 10 if the query 12 is selected for index tuning. For example, without indexes the cost of the query 12 may be 200 seconds. After adding an index, the cost for the query 12 may become 80 seconds, and thus, a reduction or improvement of the cost is 120 seconds. The potential for reduction in costs of queries 12 due to indexes may depend on the costs of filter, join, order-by, and group-by operators as well as the selectivity of the filter and join operators. For instance, if the contribution of the operators to the cost of the query 12 is high, or if the selectivity of filter and join predicates is low, the reduction in cost of the query 12 may be high since indexes can help accelerate such operators. The estimated cost 16 of the query 12 may be used in determining the utility 26 for each query 12.

An equation used by the workload summarization component 102 for calculating the utility 26 is:

$$U(q_i) = \frac{\Delta(q_i)}{\sum_{q_j \in w} \Delta(q_j)} \qquad (6)$$

where the utility (u) 26 of query (q) 12, denoted by U(q), is the potential reduction in cost of $q_i$ (when all indexes on qi are added to a database 106, 108) relative to the total reduction in cost across all queries ($q_j$) in the workload (w) 10. If a query 12 has higher utility 26, the query 12 contributes to a larger reduction in cost of the entire workload 10. As such, the utility 26 indicates an improvement of if each individual query 12 in the workload 10 was selected for the indexes.

In some implementations, the workload summarization component 102 calculates the influence of a query 12 on another query in the workload 10 if the query 12 is selected in an index. The influence of the query 12 ($q_i$) on another query ($q_j$) in the workload 10 is the reduction in the utility 26 of other query ($q_j$) when the query 12 ($q_i$) is selected for index tuning. One equation used by the workload summarization component 102 for calculating the influence of the query 12 is computed using similarity and the utility 26 of the query:

$$F_{q_i}(q_j) = S(q_i, q_j) \times U(q_j), \forall q_j \notin W_k, q_i \in W_k \qquad (7)$$

where ($Fq_i(q_j)$) is the influence of a single query 12 ($q_i$) on another query ($q_j$) in the workload 10. The influence of $q_i$ on $q_j$ captures the utility 26 of $q_j$ proportional to $q_i$'s similarity with $q_i$.

As such, the workload summarization component 102 calculates the features 24 and the utility 26 for each query 12 in the workload 10. The workload summarization component 102 uses the features 24 and the utility 26 to estimate a benefit 28 of the query 12. The benefit 28 is a measure of the similarity of the query 12 to other queries in the workload 10 and the utility 26 of the query 12. The benefit 28 identifies an estimated improvement in the workload 10 if the query 12 was selected for index tuning. The benefit 28 of each query 12 in the workload 10 is determined by the workload summarization component 102. The workload summarization component 102 uses the benefit 28 in selecting the queries (e.g., the selected queries 20) for the query sub set 18.

One equation used by the workload summarization component 102 for calculating the benefit 28 includes:

$$B(q_i) = U(q_i) + \Sigma_{q_j \in W - \{q_i\}} F_{q_i} \quad (8)$$

where the benefit 28 (B) of the query 12 ($q_i$) is the sum of its utility 26 (U) and its influence ($Fq_i(q_j)$) on other queries ($q_j$) in the workload 10 (w). A query 12 may be more useful (e.g., has a higher potential for improvement in the workload 10) if the query 12 has high utility 26 and high influence on the unselected queries in the workload 10.

In some implementations, the workload summarization component 102 incrementally selects queries 20 to include in the query subset 18 in decreasing order of benefits 28. The queries 12 with a highest benefit 28 are selected to add to the query subset 18. As such, the selected queries 20 in the query subset 18 have a high potential for reducing the cost of the workload 10 if candidate indexes are built on the databases 106, 108 using the indexable columns from the selected queries 20.

The workload summarization component 102 determines if the selected queries 20 in the query subset 18 is less than the query subset size 14. If a number of the selected queries 20 in the query subset 18 is less than the query subset size 14, the workload summarization component 102 updates the features 24 and corresponding weights and utility 26 for any remaining queries in the workload 10 in response to a query 12 being selected for the query subset 18. Updating the features 24 includes adjusting the weights of the features 24 such that queries 12 that are dissimilar from already selected queries 20 get higher values. By updating the features 24 and utilities 26, the workload summarization component 102 attempts to identify queries 12 that may result in different candidate indexes 34 if selected for the query subset 18.

In some implementations, the workload summarization component 102 updates the utility 26 of the queries remaining in the workload 10 by using the below equation:

$$U(q_j | q_i) = U(q_j) - U(q_j) \times S(q_i, q_j) \quad (9)$$

where $U(q_j|q_i)$ is the updated utility 26 of the remaining queries ($q_j$) after considering the influence of the selected query 20 ($q_i$) to the remaining queries ($q_j$) based on a similarity to the selected query 20 ($q_i$). When a query is selected (e.g., the selected query 20 ($q_i$)), the selected indexes on the selected query 20 ($q_i$) may help to reduce the utility 26 of similar queries ($q_j$) proportionally to the similarity to the selected query 20 ($q_i$). The workload summarization component 102 may reduce the utility 26 ($U(q_j)$) by $Fq_i(q_j)$.

The workload summarization component 102 may update the query features 24 so that the queries 12 in the workload 10 similar to the selected query 20 ($q_i$) have reduced similarity to each other. In some implementations, the workload summarization component 102 may use the below equation to update the query features 24 by reducing the weights of the features 24 in the selected query 20 ($q_i$) by $S(qi, qj)$:

$$q_j | q_i = q_j - S(q_i, q_j). \quad (10)$$

In some implementations, the workload summarization component 102 may use the below equation to update the query features 24 by setting the weights of the indexable columns that are present in the selected query 20 ($q_i$) to zero.

$$q_j | q_i: \text{SET } q_{jc} = 0, \forall q_{ic} > 0. \quad (11)$$

By setting the indexable columns to zero, the updated utility 26 is calculated based on the indexable columns that are uncovered (e.g., not covered by the indexable columns of the selected query 20 ($q_i$) and have a weight other than zero).

If there are multiple queries (e.g., qi1, qi2, . . . , qin) that are selected for the query subset 18, the workload summarization component 102 updates the remaining queries (e.g., qj) in the workload 10 with the selected queries 20 in order of selection.

In some implementations, the workload summarization component 102 determines the conditional influence identifying an impact of a sequence of selected queries 20 for the query subset 18. Given a sequence of selected queries $\pi$ (Q), the conditional influence of a query $q \notin Q$ on a query $q \notin Q$ is the reduction in cost of q' (q'≠q) given the influence of queries in the order of $\pi$ (Q), defined as:

$$Fq|\pi(Q)(q'|\pi(Q)) = S(q|\pi(Q), q'|\pi(Q)) \times U(q'|\pi(Q)), \quad (12)$$

or $$Fq|\pi(Q)q') = S\pi(Q)(q,q') \times U\pi(Q)(q'). \quad (13)$$

where Q is a set of selected queries 20 (e.g., {q1, . . . , qK}), $\pi$ (Q)=qi1, . . . , qiK is an arbitrary order or sequence of Q, and q|$\pi$ (Q) is the updated query q by following the sequence of queries in $\pi$ (Q).

In some implementations, the workload summarization component 102 determines a cumulative influence of a sequence of selected queries $\pi$ (Q)=qi1, . . . , qiK over a query q'$\notin$ Q as the sum of the conditional influence of qi1 on q' with respect to the prefix sequence qi1, . . . , qil−1, where 1≤l≤K. The workload summarization component 102 may use the below equation to calculate the cumulative influence of a sequence of the selected queries 20:

$$F_{\pi_{(Q)}}(q') = \sum_{l=1}^{K} F_{qil|qil, \ldots, qil-1}(q'). \quad (14)$$

In some implementations, the workload summarization component 102 determines the benefit (B(Q)) of a set of queries selected queries 20 (Q={q1, . . . , qK}) as the sum of the utilities 26 of the queries in Q and the maximum cumulative influence on queries not in Q with respect to any order $\pi$ (Q). The workload summarization component 102 may use the below equation to calculate the benefit of the set of queries:

$$B(Q) = U(Q) + \frac{\max}{\pi(Q)} \sum_{q \in W - Q} F\pi(Q)^{(q')}, \quad (15)$$

where where $U(Q) = \sum_{q \in Q} U(q). \quad (16)$

In some implementations, the workload summarization component 102 determines the maximum benefit of a set of set of queries using the below equation:

$$w_k = \frac{\text{argmax} B(S_k)}{S_k \subset w} \quad (17)$$

The workload summarization component 102 updates the benefit 28 for the remaining queries 12 based on the updated features 24 and the updated utility 26 and selects another query (e.g., the selected query 20) to add to the query subset 18 based on the updated benefit 28. For example, the workload summarization component 102 selects the query 12 with the highest updated benefit for the query subset 18. Another example includes the workload summarization component 102 selecting a plurality of queries with a same highest benefit for the query subset 18 (e.g., three queries had the same highest benefit).

In some implementations, the workload summarization component 102 uses an algorithm to select the query 12 in the workload 10 with the maximum conditional benefit to efficiently compute the compressed workload (e.g., the query subset 18 with the selected queries 20) for index tuning. The workload summarization component 102 may use the below algorithm to identify the query 12 with the maximum conditional benefit.

| Algorithm1 FindMaxBenefitQuery |   |
|---|---|
| 1. | maxbenefit = −1; |
| 2. | maxbenefitquery = null |
| 3. | for all $q_i \in W$ do |
| 4. |   if all feature in $q_j$.features = 0 then |
| 5. |     continue; |
| 6. |   end if |
| 7. |   benefit = $q_i$.utility; |
| 8. |   for all $q_j \in W$ do |
| 9. |     benefit += $S(q_i, q_j) \times q_j$.utility; |
| 10. |   end for |
| 11. |   if benefit ≥ maxbenefit then |
| 12. |     maxbenefit = benefit |
| 13. |     maxbenefitquery = $q_i$ |
| 14. |   end if |
| 15. | end for |
| 16. | Return maxbenefitquery |

The workload summarization component 102 starts with an empty set for the query subset 18 (e.g., the selected queries 20 equals to zero). In each iteration of the algorithm, the workload summarization component 102 selects the query 12 with the maximum conditional benefit. Given a sequence of selected queries $\pi(Q)$, the conditional benefit of a query $q \notin Q$ is the sum of the (discounted) utility (U) of q and its conditional influence over the unselected queries (other than q), with respect to selected queries in the order of $\pi(Q)$. The workload summarization component 102 may use the below equation in determining the conditional influence of a query (q):

$$B(Q) = U(Q) + \frac{\max}{\pi(Q)} \sum_{q \in W - Q} F\pi(Q)^{(q')}, \quad (18)$$

where B(Q) is the benefit of the query (q), U is the utility of the query (q), and F is the influence of the query (q).

At each iteration, the workload summarization component 102 may select the query (e.g., the selected query 20) with the maximum conditional benefit over the remaining queries 12 in the workload 10. After the query is selected (e.g., the selected query 20), the workload summarization component 102 updates the query features 20 and costs of the unselected queries.

In some implementations, the weights of the updated features 24 of a query 12 may be set to zero after selecting one or more queries (e.g., the selected queries 20) for the query subset 18. The selected queries 20 may cover all the indexes with a query 12 with zero weights for the updated features 24. As such, the workload summarization component 102 may use the below algorithm to consider only those queries with at least one non-zero weight for the updated features 24 in the workload 10 as potential candidates for the selected queries 20 for the query subset.

| Algorithm2 Greedy Selection |   |
|---|---|
| 1. | for all $q_i \in W$ do |
| 2. |   $q_i$.utility = CompleteUtility ($q_i$) |
| 3. |   $q_i$.features = CompleteQueryFeatures ($q_i$) |
| 4. | end for |
| 5. | $W_k = 0$ |
| 6. | $T \leftarrow W$ |
| 7. | while $W_k$.size( )<k do |
| 8. |   $q_s \leftarrow$ FindMaxBenefitQuery(W) |
| 9. |   $W_k \leftarrow$ AddQuery($W_k, q_s$) |
| 10. |   $T \leftarrow$ RemoveQuery(T,$q_s$) |
| 11. |   $T \leftarrow$ UpdateWorkload(T,$q_s$) |
| 12. |   $T \leftarrow$ ResetQueryFeaturesIfAllWeightsZero(T,W) |
| 13. | end while |
| 14. | Return $W_k$ |

For large sizes of compressed workload (e.g., a large number of selected queries 20 in the query subset 18), it may be possible after certain point that all the remaining queries 12 in the workload 10 may have zero-weight features. In such cases, the workload summarization component 102 may reset the query features 24 of unselected queries to their original weights (e.g., the line 12 of Algorithm 2).

The workload summarization component 102 may continue to update the features 24, the utility 26, and the benefit 28 of the remaining queries 12 in the workload 10 after selecting a query to add to the query subset 18 until the selected queries 20 equal the query subset size 14. The selected queries 20 may lead to high performance improvements in the workload 10.

The number of selected queries 20 included in the query subset 18 equals the query subset size 14. For example, if the workload 10 includes 100 queries 12 and the query subset size 14 is 10 queries, then the 10 queries with the highest benefit 28 are included in the query subset 18.

In some implementations, the workload summarization component 102 generates workload summary features 30 that summarizes all queries 12 in the workload 10 using a concise representation while ensuring that salient characteristics of the queries are preserved in the workload summary features 30. The workload summary features 30 aggregates query-level features 24 into a single workload-level features such that a higher weight is given to features 24 of queries 12 with high potential for performance improvement in the workload 10. The single workload-level features representation allows measuring the similarity of each query 12 with the input workload 10 without performing pairwise comparisons, thereby allowing the use of a fast linear-time algorithm.

The workload summary features 30 is a set of all indexable columns in the workload 10 where the value of each feature (e.g., the indexable column) is the weighted (using a normalized utility of the query) sum of values of the features across all queries 12 in the workload 10.

In some implementations, the workload summarization component 102 may use the following equations in determining the workload summary features 30. For a given query given query ($q_i$), the weight of a column (c) denoted by query ($q_{ic}$) represents the importance of the column (c) in the query ($q_{ic}$). The workload summarization component 102 modifies the weight such that it reflects the weight of the column at workload-level. The weight of a column (c) in query ($q_i$) at the workload-level, denoted by $V_{ic}$, may be measured by the workload summarization component 102 using the utility (U) of the query ($q_i$) as follows:

$$V_{ic}=q_{ic} \times I(q_i). \tag{19}$$

Similarly, the weight of a column (c) at workload-level may be derived by the workload summarization component 102 as the sum of the weights of columns (c) across all queries at workload-level:

$$V_c = \Sigma_{q_i \in W} q_{ic} \times U(q_i). \tag{20}$$

The influence of a query ($q_s$) with respect to a summary features V that excludes the query ($q_s$), may be computed by the workload summarization component 102 as follows:

$$F_{q_s}(V)=S(q_s,V). \tag{21}$$

Thus, given a summary features, V, the workload summarization component 102 may directly compute the influence of a query ($q_i$) as $F_{q_s}$ (V) instead of $F_{q_s}$ (W), thereby avoiding all-pairs comparisons.

In some implementations, the workload summarization component 102 determines the benefit of the query 12 based on the workload summary features 30. For each query 12 in the workload 10, the workload summarization component 102 may compare the features 24 and utility 26 of the query 12 to the workload summary features 30 to determine the estimated benefit 28 of the query 12 without performing all-pairs comparisons with every query 12 in the workload 10.

The workload summarization component 102 uses the benefit 28 in selecting the queries (e.g., the selected queries 20) for the query subset 18. For example, the queries 12 with a highest benefit 28 are selected for the query subset 18. If a number of the selected queries 20 in the query subset 18 is less than the query subset size 14, the workload summarization component 102 updates the features 24 and corresponding weights, the utility 26, and the workload summary features 30 for any remaining queries in the workload 10 in response to a query 12 being selected for the query subset 18.

In some implementations, the workload summarization component 102 uses the below algorithm for finding the query 12 with the maximum benefit 28 using the workload summary features 30.

| Algorithm3 FindMaxBenefitQueryUsingSummaryFeatures |
| --- |
| 1.  maxbenefit = −1; |
| 2.  maxbenefitquery = null |
| 3.  V = ComputeSummaryFeatures (W) |
| 4.  totalutility = ComputeSummaryFeatures (W) |
| 5.  for all $q_j \in$ W do |
| 6.   if all feature in $q_i$.features = 0 then |
| 7.    continue; |
| 8.   end if |
| 9.   contributiontoV = $q_i$.features |
| 10.   reducedtotalutility = totalutility − $q_i$.utility |
| 11.  $V' = (V - contributiontoV) \times \dfrac{totalutility}{reducedtotalutility};$ |
| 12.   benefit = $q_i$.utility + S($q_i$.features, V') |

| Algorithm3 FindMaxBenefitQueryUsingSummaryFeatures |
| --- |
| 13.   if benefit ≥ maxbenefit then |
| 14.    maxbenefit = benefit |
| 15.    maxbenefitquery = $q_i$ |
| 16.   end if |
| 17.  end for |
| 18.  Return maxbenefitquery |

After selecting each query (e.g., the selected query 20), the workload summarization component 102 updates the query features 24 and the utility 26 of any remaining queries 12 in the workload 10 and then regenerates the workload summary features 30 based on the updated features 24 and the utility 26. If n is the number of queries in the workload, and k is the size of the compressed workload, the runtime complexity of the algorithm is O(k×n), resulting in order of magnitude improvement in efficiency.

Updating the features 24 may include adjusting the weights of the features 24 such that queries 12 that are dissimilar from already selected queries 20 get higher values by removing the features 24 of the selected query 20 from the workload summary features 30. By updating the features 24, the utilities 26, and the workload summary features 30, the workload summarization component 102 attempts to identify queries 12 that may result in different candidate indexes 34 if selected for the query sub set 18.

The workload summarization component 102 updates the benefit 28 for the remaining queries 12 based on the updated workload summary features 30 by comparing the updated features 24 and the updated utility 26 to the updated workload summary features 30. The workload summarization component 102 selects another query (e.g., the selected query 20) to add to the query subset 18 based on the updated benefit 28.

The workload summarization component 102 may continue to update the features 24, the utility 26, the workload summary features 30, and the benefit 28 of the remaining queries 12 in the workload 10 after selecting a query to add to the query subset 18 until the selected queries 20 equal the query subset size 14.

The selected queries 20 included in the query subset 18 represent the input workload 10 to varying degrees. The workload summarization component 102 determines query weights 22 that captures a relative importance of the selected query 20 with respect to the input workload 10 (e.g., a percentage of the queries 12 included in the workload 10 the selected query 20 represents). For example, if the workload 10 includes 100 queries 12, the query weight 22 indicates that one of the selected queries 20 represents 90 percent of the queries 12 in the workload 10 and another of the selected queries 20 represents 75 percent of the queries 12 in the workload 10.

In some implementations, the workload summarization component 102 assigns query weights 22 to each of the selected queries 20 in the query subset 18 based on their own utility and influence on the other queries 12 in the workload 10. Given a weight wt ($q_i$) for a query ($q_i$) and the set of indexes $I_k$ selected by tuning the compressed workload $W_k$ (e.g., the query subset 18), the improvement over the workload W is defined as:

$$\Delta(W)=\Sigma_{q_i \in W} wt(qi) \times (C(q_i)-C_{I_k}(q_i)). \tag{22}$$

In some implementations, the workload summarization component 102 assigns query weights 22 to each to the selected queries 20 in the query subset 18 based on a modified utility of the selected queries 20. The workload 10 may consists of multiple instances of the same query template. Thus, indexes selected for one of the instances may benefit all instances within the same template, though the amount of benefit may vary depending on the selectivity of predicates and costs of the queries. For such scenarios, the workload summarization component 102 may modify the utility of selected instances such that they together cover the total utility of all instances for the same template. The workload summarization component 102 may use the below algorithm for assigning the query weights 22 to each of the selected queries 20 based on a modified utility of the selected queries 20.

| Algorithm4 Template-Based Utility Computation |
|---|
| 1. T ← Compute unique query templates in $W_k$ |
| 2. for all t ∈ T do |
| 3.     t.freq ← Compute number of queries matching template t in $W_k$ |
| 4.     t.totalutiltiy ← Compute sum of utilities of queries in W for template t |
| 5. end for |
| 6. W' ← Remove queries in W with matching templates in T |
| 7. $W_k$' ← θ |
| 8. for all $q_i$ ∈ $W_k$ do |
| 9.     template ← $q_i$ template |
| 10.     $q_i$.utility = $\frac{\text{template.}totalutility}{\text{template.}freq}$ |
| 11. Return $W_k$W'; |

In some implementations, the workload summarization component 102 assigns query weights 22 to each to the selected queries 20 in the query subset 18 based on a re-calibrated benefit of the selected queries 20. The workload summarization component 102 may use the below algorithm to assign the query weights 22 to each of the selected queries 20 based on the re-calibrated benefit for the queries with non-matching templates.

| Algorithm5 Weighing of Selected Queries |
|---|
| 1.     $W_k$, $W_u$ ← TemplateBasedUtilityComputation ($W_k$, W) |
| 2.     Q = ComputeSummaryFeatures($W_u$,) |
| 3.     queryweights = { }, totalbenefits = 0 |
| 4.     while $W_k$.size( )> do |
| 5.         for all $q_i$ ∈ $W_k$ do |
| 6.             benefit = $q_i$.utility + S($q_i$.features, Q) |
| 7.             if benefit ≥ maxbenefit then |
| 8.                 maxbenefit = benefit |
| 9.                 maxbenefitquery = $q_i$ |
| 10.            end if |
| 11.        end for |
| 12.        totalbenefits ← totalbenefits + maxbenefit |
| 13.        queryweights.Add (maxbenefitquery, maxbenefit) |
| 14.        $W_k$ ← RemoveQuery ($W_k$, maxbenefitquery) |
| 15.        $W_u$ ← UpdateWorkload ($W_u$, maxbenefitquery) |
| 16.     end while |
| 17.     for all $q_i$ ∈ queryweights.Keys( ) do |
| 18.        queryweights[$q_i$] = queryweights [$q_i$]/totalbenefits; |
| 19.     end for |
| 20.     Return query weights; |

The workload summarization component 102 provides the query subset 18, consisting of the selected queries 20 and the corresponding query weights 22, to the index tuner 104 to generate index recommendations 32 for candidate indexes 34. As such, the index tuner 104 uses a compressed workload (e.g., the selected queries 20 in the query subset 18) to perform the index tuning and generate the index recommendations 32.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the workload summarization component 102, the index tuner 104, and/or the databases 106, 108 are implemented wholly on the same computing device. Another example includes one or more subcomponents of the workload summarization component 102, the index tuner 104, and/or the databases 106, 108 are implemented across multiple computing devices. Moreover, in some implementations, one or more subcomponent of the workload summarization component 102, the index tuner 104, and/or the databases 106, 108 may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

The environment 100 identifies a compressed workload (the query subset 18) that identifies a subset of salient queries (e.g., the selected queries 20) in large workloads 10 for scalable index tuning without making optimizer calls. The environment 100 uses an index-specific query featurization that helps measure the similarity between queries in terms of index usage. As such, the environment 100 enables efficient index tuning using the query subset 18. Moreover, the environment 100 provides index recommendations 32 based on the selected queries 20 that significantly improve the performance of the input workload 10.

Figure 2:
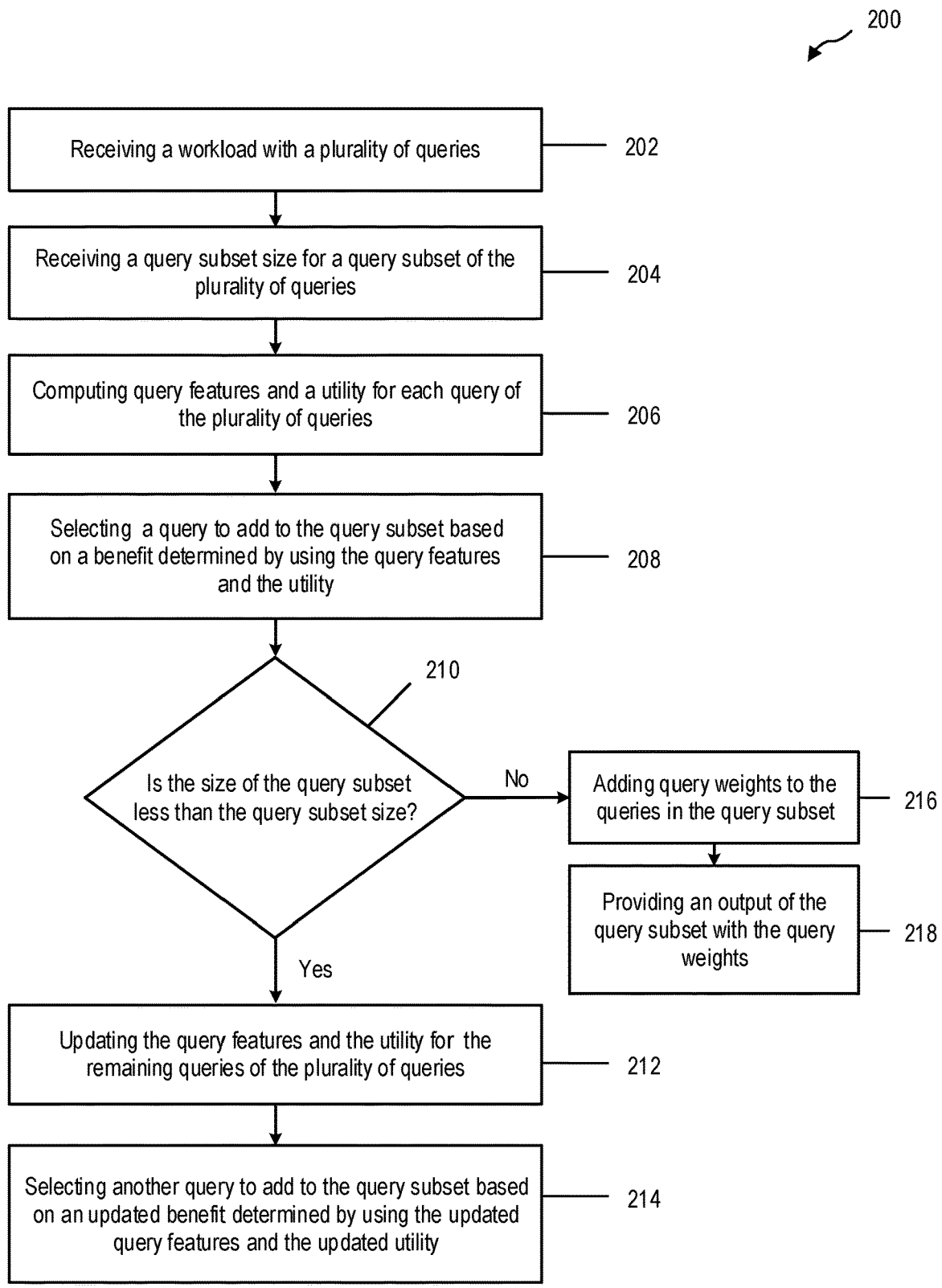
FIG. 2 illustrates an example method for compressing workloads for use with index tuning in accordance with implementations of the present disclosure.

Referring now to FIG. 2, illustrated is an example method 200 for compressing workloads for use with index tuning. The actions of method 200 are discussed below with reference to the architecture of FIG. 1.

At 202, the method 200 includes receiving a workload with a plurality of queries. a workload summarization component 102 that receives a workload 10 with a plurality of queries 12. The workload 10 includes a collection of queries 12 or a group of queries 12 for querying a given database (e.g., databases 106, 108) for results. In some implementations, the queries are structured query language (SQL) queries (also referred to as sequel queries). Each query 12 also includes an estimated cost 16 for running the query 12. The estimated cost 16 includes an amount of time to run the query 12.

At 204, the method 200 includes receiving a query subset size for a query subset of the plurality of queries. The workload summarization component 102 also receives a query subset size 14 with a number of queries to include in a query subset 18 to use in index tuning. The query subset size 14 may be any positive number less than the number of queries 12 included in the workload 10.

At 206, the method 200 includes computing query features and a utility for each query of the plurality of queries. The workload summarization component 102 computes features 24 for each query 12 in the workload 10. By representing each of the queries 12 as a set of features 24, two queries 12 with similar values of the features 24 may likely result in a similar set of indexes. Representing each query 12 as a set of features 24 also allows a quantification of a similarity between queries 12 with different templates.

The features 24 include the indexable columns in the query 12 and an associated weight for the indexable columns. The query features 24 is a set of normalized weights, one normalized weight for each indexable column in the workload. A column in a query is indexable if the column is part of a filter or join condition, or if the column specifies the grouping or ordering of tuples. As such, the following columns are indexable columns: (1) filter columns, (2) join columns, (3) group-by columns, and (4) order-by columns. Index tuners 104 derive candidate indexes 34 from indexable columns by combing the indexable columns in different orders.

The weight for the indexable columns assigns a value to the indexable columns for an improvement in a performance of the workload 10 in response to each indexable column being used in a candidate index for tuning. For example, a higher weight is given to indexable columns with a high potential for performance improvement in the workload 10 (e.g., a faster search and/or using less resources) and a lower weight is given to indexable columns with a lower potential for performance improvement in the workload 10.

In some implementations, the workload summarization component 102 may determine the weight of an indexable column by counting the proportion of candidate indexes that an indexable column belongs to. In some implementations, the workload summarization component 102 may use statistics, such as, selectivity or density of an indexable column to determine the weight of the indexable column.

The workload summarization component 102 also computes a utility 26 for each query 12 in the workload 10. The utility 26 is an estimated improvement (e.g., a reduction in cost) in the workload 10 if the query 12 is selected as a candidate index for index tuning. The potential for reduction in costs of queries 12 due to indexes may depend on the costs of filter, join, order-by, and group-by operators as well as the selectivity of the filter and join operators. For instance, if the contribution of the operators to the cost of the query 12 is high, or if the selectivity of filter and join predicates is low, the reduction in cost of the query 12 may be high since indexes can help accelerate such operators. The estimated cost 16 of the query 12 may be used in determining the utility 26 for each query 12. As such, the workload summarization component 102 calculates the features 24 and the utility 26 for each query 12 in the workload 10.

At 208, the method 200 includes selecting a query to add to the query subset based on a benefit determined by using the query features and the utility. The workload summarization component 102 uses the features 24 and the utility 26 to estimate a benefit 28 of the query 12. The benefit 28 combines a measure of the similarity of the query 12 to other queries in the workload 10 and the utility 26 of the query 12 (an estimated reduction in cost of the workload 10). The benefit 28 identifies an estimated improvement in the workload 10 if the query 12 was selected for index tuning. The benefit 28 of each query 12 in the workload 10 is determined by the workload summarization component 102. The workload summarization component 102 uses the benefit 28 in selecting the queries (e.g., the selected queries 20) for the query subset 18.

The workload summarization component 102 adds the selected query 20 to the query subset 18. In some implementations, the workload summarization component 102 incrementally selects queries (e.g., the selected queries 20) to include in the query subset 18 in decreasing order of benefits 28. The queries 12 with a highest benefit 28 are selected to add to the query subset 18 as compared to the benefits of the other queries in the workload 10. As such, the selected queries 20 in the query subset 18 have a high potential for reducing the cost of the workload 10 if candidate indexes are built on the databases 106, 108 using the indexable columns from the selected queries 20.

At 210, the method 200 includes determining whether the size of the query subset is less than the query subset size. The workload summarization component 102 determines if the selected queries 20 in the query subset 18 is less than the query subset size 14.

At 212, the method includes updating the query features and the utility for the remaining queries of the plurality of queries in response to determining that the size of the query subset is less than the query subset size. If a number of the selected queries 20 in the query subset 18 is less than the query subset size 14, the workload summarization component 102 updates the features 24 and corresponding weights and utility 26 for any remaining queries in the workload 10. Updating the features 24 includes adjusting the weights of the features 24 such that queries 12 that are dissimilar from already selected queries 20 get higher values. By updating the features 24 and utilities 26, the workload summarization component 102 attempts to identify queries 12 that may result in different candidate indexes 34 if selected for the query subset 18.

At 214, the method 200 includes selecting another query to add to the query subset based on an updated benefit determined by using the updated features and the updated utility. The workload summarization component 102 updates the benefit 28 for the remaining queries 12 based on the updated features 24 and the updated utility 26. The workload summarization component 102 selects another query (e.g., the selected query 20) to add to the query subset 18 based on the updated benefit 28. For example, the workload summarization component 102 selects the query from the remaining queries 12 with the highest updated benefit for the query subset 18. In some implementations, the workload summarization component 102 uses an algorithm to select the query 12 in the workload 10 with the maximum updated benefit to efficiently compute the compressed workload (e.g., the query subset 18 with the selected queries 20) for index tuning.

The method 200 may continue to return to 210 until the size of the query subset is equal to the query subset size. The workload summarization component 102 may continue to update the features 24, the utility 26, and the benefit 28 of the remaining queries 12 in the workload 10 after selecting a query to add to the query subset 18 until the selected queries 20 equal the query subset size 14. The number of selected queries 20 included in the query subset 18 equals the query subset size 14. For example, if the workload 10 includes 300 queries 12 and the query subset size 14 is 20 queries, then 20 queries are selected for the query subset 18. The selected queries 20 may lead to high performance improvements in the workload 10.

At 216, the method 200 includes adding query weights to the queries in the query subset in response to determining that the size of the query subset is equal to the query subset size. The selected queries 20 included in the query subset 18 represent the input workload 10 to varying degrees. The workload summarization component 102 determines query weights 22 that captures a relative importance of the selected query 20 with respect to the input workload 10 (e.g., a percentage of the queries 12 included in the workload 10 that are similar to the selected query 20 in the query subset 18). For example, if the workload 10 includes 100 queries 12, the query weight 22 indicates that one of the selected queries 20 represents 90 percent of the queries 12 in the workload 10 and another of the selected queries 20 represents 75 percent of the queries 12 in the workload 10.

In some implementations, the workload summarization component 102 assigns query weights 22 to each of the selected queries 20 in the query subset 18 based on their own utility and influence on the other queries 12 in the workload 10. In some implementations, the workload summarization component 102 assigns query weights 22 to each to the selected queries 20 in the query subset 18 based on a modified utility of the selected queries 20. In some implementations, the workload summarization component 102 assigns query weights 22 to each to the selected queries 20 in the query subset 18 based on a re-calibrated benefit of the selected queries 20.

At 218, the method 200 includes providing an output of the query subset with the query weights. The workload summarization component 102 provides the query subset 18, consisting of the selected queries 20 and the corresponding query weights 22, to the index tuner 104 to generate index recommendations 32 for candidate indexes 34 to use on databases 106, 108. As such, the index tuner 104 uses a compressed workload (e.g., the selected queries 20 in the query subset 18) to perform the index tuning and generate the index recommendations 32.

The method 200 may be used to provide a query subset for efficient index tuning by using a low-overhead technique for estimating the improvement in performance of the input workload when a subset of queries is selected for index tuning. The method 200 may reduce the time and resources required for tuning large workloads, and thus, improve the performance of workloads running on database systems or services while also reducing the total cost of ownership of the databases systems or services.

Figure 3:
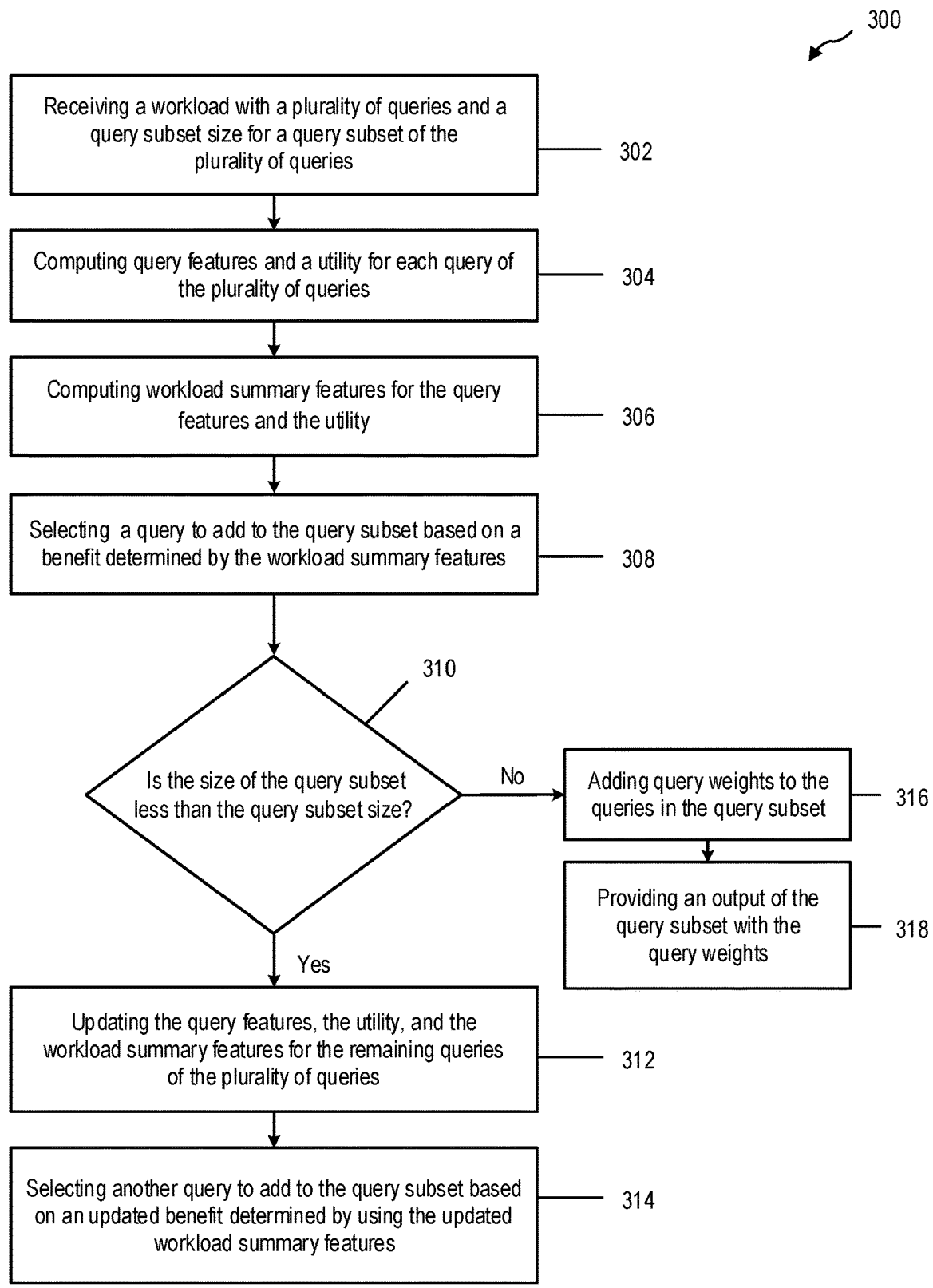
FIG. 3 illustrates an example method for compressing workloads using workload summary features in accordance with implementations of the present disclosure.

Referring now to FIG. 3, illustrated is an example method 300 for compressing workloads using workload summary features. The actions of method 300 are discussed below with reference to the architecture of FIG. 1.

At 302, the method 300 includes receiving a workload with a plurality of queries and a query subset size for a query subset of the plurality of queries. a workload summarization component 102 that receives a workload 10 with a plurality of queries 12. The workload 10 includes a collection of queries 12 or a group of queries 12 for querying one or more databases 106, 108 for results. In some implementations, the queries are structured query language (SQL) queries (also referred to as sequel queries). Each query 12 also includes an estimated cost 16 for running the query 12. The estimated cost 16 includes an amount of time to run the query 12.

The workload summarization component 102 also receives a query subset size 14 with a number of queries to include in a query subset 18 to use in index tuning. The query subset size 14 may be any positive number less than the number of queries 12 included in the workload 10.

At 304, the method 300 includes computing query features and a utility for each query of the plurality of queries. The workload summarization component 102 computes features 24 for each query 12 in the workload 10. By representing each of the queries 12 as a set of features 24, two queries 12 with similar values of the features 24 may likely result in a similar set of indexes. Representing each query 12 as a set of features 24 also allows a quantification of a similarity between queries 12 with different templates.

The features 24 include the indexable columns in the query 12 and an associated weight for the indexable columns. The query features 24 is a set of normalized weights, one normalized weight for each indexable column in the workload. A column in a query is indexable if the column is part of a filter or join condition, or if the column specifies the grouping or ordering of tuples. As such, the following columns are indexable columns: (1) filter columns, (2) join columns, (3) group-by columns, and (4) order-by columns. Index tuners 104 derive candidate indexes 34 from indexable columns by combing the indexable columns in different orders.

The weight for the indexable columns assigns a value to the indexable columns for an improvement in a performance of the workload 10. For example, a higher weight is given to indexable columns with a high potential for performance improvement in the workload 10 (e.g., a faster search and/or using less resources) and a lower weight is given to indexable columns with a lower potential for performance improvement in the workload 10.

In some implementations, the workload summarization component 102 may determine the weight of an indexable column by counting the proportion of candidate indexes that an indexable column belongs to. In some implementations, the workload summarization component 102 may use statistics, such as, selectivity or density of an indexable column to determine the weight of the indexable column.

The workload summarization component 102 also computes a utility 26 for each query 12 in the workload 10. The utility 26 is an estimated improvement (e.g., a reduction in cost) in the workload 10 if the query 12 is selected for index tuning. The potential for reduction in costs of queries 12 due to indexes may depend on the costs of filter, join, order-by, and group-by operators as well as the selectivity of the filter and join operators. For instance, if the contribution of the operators to the cost of the query 12 is high, or if the selectivity of filter and join predicates is low, the reduction in cost of the query 12 may be high since indexes can help accelerate such operators. The estimated cost 16 of the query 12 may be used in determining the utility 26 for each query 12. As such, the workload summarization component 102 calculates the features 24 and the utility 26 for each query 12 in the workload 10.

At 306, the method 300 includes computing workload summary features for the query features and the utility. The workload summarization component 102 computes workload summary features 30 that summarizes all queries 12 in the workload 10 using a concise representation while ensuring that salient characteristics of the queries are preserved in the workload summary features 30. The workload summary features 30 provide a single set of features for the workload 10. The workload summary features 30 aggregates query-level features 24 into a single workload-level features such that a higher weight is given to features 24 of queries 12 with high potential for performance improvement in the workload 10. The single workload-level features representation allows measuring the similarity of each query 12 with the input workload 10 without performing pairwise comparisons, thereby allowing the use of a fast linear-time algorithm. The workload summary features 30 is a set of all indexable columns in the workload 10 where the value of each feature (e.g., the indexable column) is the weighted (using a normalized utility of the query) sum of values of the features across all queries 12 in the workload 10.

At 308, the method 300 includes selecting a query to add to the query subset based on a benefit determined by using the workload features. The workload summarization component 102 determines the benefit of the query 12 based on the workload summary features 30. For each query 12 in the workload 10, the workload summarization component 102 may compare the features 24 and the utility 26 of the query 12 to the workload summary features 30 to determine the estimated benefit 28 of the query 12 without performing all-pairs comparisons with every query 12 in the workload 10.

The workload summarization component 102 uses the benefit to estimate an impact on the workload 10. The impact on the workload includes a calculation of a similarity of each query to other queries in the plurality of queries and a reduction in cost of the workload 10. For example, a higher benefit includes a higher impact on the workload 10 and a lower benefit includes a lower impact on the workload 10.

The workload summarization component 102 uses the benefit 28 in selecting the queries (e.g., the selected queries 20) for the query subset 18. For example, the queries 12 with a highest benefit 28 are selected for the query subset 18. If a number of the selected queries 20 in the query subset 18 is less than the query subset size 14, the workload summarization component 102 updates the features 24 and corresponding weights, the utility 26, and the workload summary features 30 for any remaining queries in the workload 10 in response to a query 12 being selected for the query subset 18.

The workload summarization component 102 adds the selected query 20 to the query subset 18. In some implementations, the workload summarization component 102 incrementally selects queries (e.g., the selected queries 20) to include in the query subset 18 in decreasing order of benefits 28. The queries 12 with a highest benefit 28 are selected to add to the query subset 18. As such, the selected queries 20 in the query subset 18 have a high potential for reducing the cost of the workload 10 if candidate indexes are built on the databases 106, 108 using the indexable columns from the selected queries 20.

At 310, the method 300 includes determining whether the size of the query subset is less than the query subset size. The workload summarization component 102 determines if the selected queries 20 in the query subset 18 is less than the query subset size 14.

At 312, the method 300 includes updating the query features, the utility, and the workload summary features for the remaining queries of the plurality of queries in response to determining that the size of the query subset is less than the query subset size. If a number of the selected queries 20 in the query subset 18 is less than the query subset size 14, the workload summarization component 102 updates the features 24 and corresponding weights and utility 26 for any remaining queries in the workload 10. In addition, the workload summarization component 102 updates the workload summary features 30 for the remaining queries in the workload based on the updated query features and the updated utility of the remaining queries in the workload 10.

Updating the updating the features and the utility includes providing higher values for the features 24 and the utility 26 for the remaining queries in the workload 10 that are dissimilar to the query selected for the query subset 18. For example, updating the features 24 may include adjusting the weights of the features 24 such that queries 12 that are dissimilar from already selected queries 20 get higher values by removing the features 24 of the selected query 20 from the workload summary features 30. By updating the features 24, the utilities 26, and the workload summary features 30, the workload summarization component 102 attempts to identify queries 12 that may result in different candidate indexes 34 if selected for the query subset 18.

At 314, the method 300 includes selecting another query to add to the query subset based on an updated benefit determined by using the updated workload summary features. The workload summarization component 102 updates the benefit 28 for the remaining queries 12 based on the updated workload summary features 30 by comparing the updated features 24 and the updated utility 26 to the updated workload summary features 30. The workload summarization component 102 selects another query (e.g., the selected query 20) to add to the query subset 18 based on the updated benefit 28.

The workload summarization component 102 selects another query (e.g., the selected query 20) to add to the query subset 18 based on the updated benefit 28. For example, the workload summarization component 102 selects the query from the remaining queries 12 with the highest updated benefit for the query subset 18. In some implementations, the workload summarization component 102 uses an algorithm to select the query 12 in the workload 10 with the maximum updated benefit to efficiently compute the compressed workload (e.g., the query subset 18 with the selected queries 20) for index tuning.

The method 300 may continue to return to 310 until the size of the query subset is equal to the query subset size. The workload summarization component 102 may continue to update the features 24, the utility 26, the workload summary features 30, and the benefit 28 of the remaining queries 12 in the workload 10 after selecting a query to add to the query subset 18 until the selected queries 20 equal the query subset size 14. The number of selected queries 20 included in the query subset 18 equals the query subset size 14. For example, if the workload 10 includes 300 queries 12 and the query subset size 14 is 20 queries, then 20 queries are selected for the query subset 18. The selected queries 20 may lead to high performance improvements in the workload 10.

At 316, the method 300 includes adding query weights to the queries in the query subset in response to determining that the size of the query subset is equal to the query subset size. The selected queries 20 included in the query subset 18 represent the input workload 10 to varying degrees. The workload summarization component 102 determines query weights 22 that captures a relative importance of the selected query 20 with respect to the input workload 10 (e.g., a percentage of the queries 12 included in the workload 10 that the selected query 20 represents). For example, if the workload 10 includes 100 queries 12, the query weight 22 indicates that one of the selected queries 20 represents 90 percent of the queries 12 in the workload 10 and another of the selected queries 20 represents 75 percent of the queries 12 in the workload 10.

In some implementations, the workload summarization component 102 assigns query weights 22 to each of the selected queries 20 in the query subset 18 based on their own utility and influence on the other queries 12 in the workload 10. In some implementations, the workload summarization component 102 assigns query weights 22 to each to the selected queries 20 in the query subset 18 based on a modified utility of the selected queries 20. In some implementations, the workload summarization component 102 assigns query weights 22 to each to the selected queries 20 in the query subset 18 based on a re-calibrated benefit of the selected queries 20.

At 318, the method 300 includes providing an output of the query subset with the query weights. The workload summarization component 102 provides the query subset 18, consisting of the selected queries 20 and the corresponding query weights 22, to the index tuner 104 to generate index recommendations 32 for candidate indexes 34 to use on databases 106, 108. As such, the index tuner 104 uses a compressed workload (e.g., the selected queries 20 in the query subset 18) to perform the index tuning and generate the index recommendations 32.

The method 300 may be used to concisely represent information across queries in the workload in a summarized workload level features. The summarized workload level features may be leveraged to directly estimate the impact of selected queries on the entire workload without performing pairwise comparison between queries. The method 300 may reduce the time and resources required for tuning large workloads, and thus, improve the performance of workloads running on database systems or services while also reducing the total cost of ownership of the databases systems or services.

Figure 4:
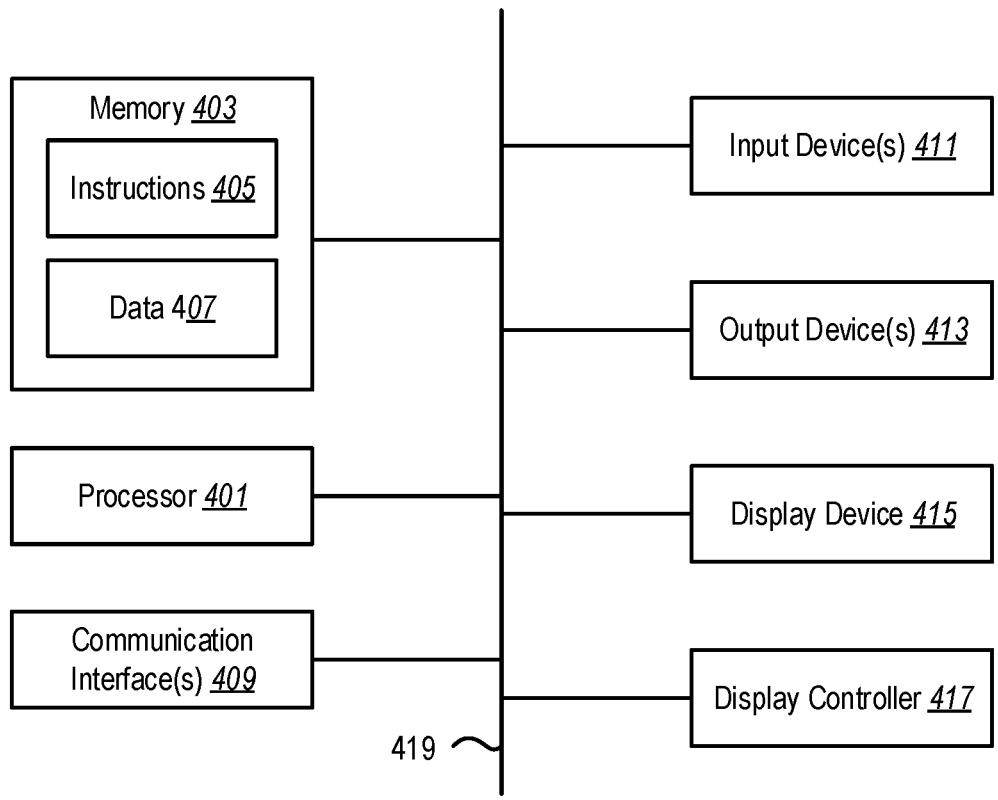
FIG. 4 illustrates components that may be included within a computer system.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB) 419, an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a transformer model, a classification model, a regression model, a language model, an object detection model) that can be tuned (e.g., trained) based on training input to approximate unknown functions. For example, a machine learning model may refer to a neural network (e.g., a transformer neural network, a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a workload with a plurality of queries;
   computing, for each query of the plurality of queries, query features and a utility;
   selecting a query to add to a query subset based on a benefit determined by using the query features and the utility;
   determining whether a size of the query subset is less than a query subset size;
   updating the query features and the utility for remaining queries of the plurality of queries in response to determining the size of the query subset is less than the query subset size;
   selecting another query to add to the query subset based on an updated benefit using updated query features and updated utility in response to determining the size of the query subset is less than the query subset size, wherein the query features of the another query has reduced similarity to the query features of queries within the query subset;
   continuing to update the query features and the utility for the remaining queries of the plurality of queries and selecting other queries to add to the query subset based on the updated benefit determined by using the updated query features and the updated utility until the size of the query subset is equal to the query subset size, wherein the query features of the other queries have a reduced similarity to the query features of queries within the query subset; and
   adding query weights to selected queries in the query subset in response to determining the size of the query subset is equal to the query subset size.

2. The method of claim 1, further comprising:
   providing an output of the query subset with the query weights to an index tuner to use in providing recommendations for candidate indexes to use on databases.

3. The method of claim 1, wherein the workload includes an estimated cost for each query of the plurality of queries.

4. The method of claim 3, wherein the estimated cost includes an amount of time to run the query.

5. The method of claim 1, wherein the benefit combines a similarity of the query to other queries in the plurality of queries and an estimated reduction in cost of the workload.

6. The method of claim 1, wherein the query selected for the query subset has a highest benefit as compared to the benefit of the other queries in the plurality of queries.

7. The method of claim 1, wherein the utility is an estimated reduction of cost for the workload in response to the query being used in a candidate index.

8. The method of claim 1, wherein the query features identify a plurality of indexable columns of the query and an associated weight for each indexable column of the plurality of indexable columns, wherein the associated weight is a value for an improvement in a performance of the workload in response to each indexable column being used in a candidate index for index tuning.

9. The method of claim 1, wherein updating the query features and the utility includes providing higher values for the query features and the utility for the remaining queries that are dissimilar to the query selected for the query subset.

10. The method of claim 1, wherein the query weights identify a percentage of queries in the plurality of queries that are similar to selected queries in the query subset.

11. A method, comprising:
receiving a workload with a plurality of queries;
computing, for each query of the plurality of queries, query features and a utility;
computing workload summary features for the query features and the utility;
selecting a query to add to a query subset based on a benefit determined by using the workload summary features;
determining whether a size of the query subset is less than a query subset size;
updating the query features, the utility, and the workload summary features for remaining queries of the plurality of queries in response to determining the size of the query subset is less than the query subset size;
selecting another query to add to the query subset based on an updated benefit determined by using updated workload summary features in response to determining the size of the query subset is less than the query subset size, wherein the query features of the another query has reduced similarity to the query features of queries within the query subset;
continuing to update the query features, the utility, and the workload summary features for the remaining queries of the plurality of queries and selecting other queries to add to the query subset based on the updated benefit determined by using the updated workload summary features until the size of the query subset is equal to the query subset size, wherein the query features of the other queries have a reduced similarity to the query features of queries within the query subset; and
adding query weights to the selected queries in the query subset in response to determining the size of the query subset is equal to the query subset size.

12. The method of claim 11, wherein the workload summary features provides a single set of features for the workload.

13. The method of claim 11, wherein the benefit is determined for each query by comparing each query to the workload summary features to estimate an impact on the workload and the query with a highest benefit is selected for the query subset.

14. The method of claim 13, wherein the impact on the workload includes a calculation of a similarity of each query to other queries in the plurality of queries and a reduction in cost of the workload.

15. The method of claim 13, wherein a higher benefit includes a higher impact on the workload and a lower benefit includes a lower impact on the workload.

16. The method of claim 11, wherein updating the query features and the utility includes providing higher values for the query features and the utility for the remaining queries that are dissimilar to the query selected for the query subset.

17. The method of claim 11, wherein updating the workload summary includes:
removing the query features and the utility from the workload summary of the query added to the query subset; and
generating the updated workload summary based on the updated query features and the updated utility of the remaining queries in the plurality of queries.

18. The method of claim 11, wherein the query weights are based on the utility and an influence of selected queries in the query subset relative to the plurality of queries in the workload.

19. The method of claim 11, wherein the query weights are based on a re-calibrated benefit of selected queries in the query subset.

20. The method of claim 11, further comprising:
providing an output of the query subset with the query weights to an index tuner to use in providing recommendations for candidate indexes to use on databases.

* * * * *